(12) United States Patent
Yeh et al.

(10) Patent No.: US 7,697,279 B2
(45) Date of Patent: Apr. 13, 2010

(54) MOUNTING APPARATUS FOR STORAGE DEVICE

(75) Inventors: Chin-Wen Yeh, Taipei Hsien (TW); Jia-Ming Dong, Shenzhen (CN)

(73) Assignees: Hong Fu Jin Precision Industry (ShenZhen) Co., Ltd., Shenzhen, Guangdong Province (CH); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 87 days.

(21) Appl. No.: 11/967,084

(22) Filed: Dec. 29, 2007

(65) Prior Publication Data

US 2009/0168323 A1 Jul. 2, 2009

(51) Int. Cl.
*H05K 7/14* (2006.01)

(52) U.S. Cl. .............................. 361/679.39; 361/679.33; 312/223.2

(58) Field of Classification Search ............ 361/679.37, 361/679.39, 679.33; 312/223.2; 248/205.1
See application file for complete search history.

(56) References Cited

U.S. PATENT DOCUMENTS

| 5,349,483 | A | 9/1994 | Tsai |
| 7,489,504 | B2 * | 2/2009 | Chen et al. ............. 361/679.37 |
| 7,492,585 | B2 * | 2/2009 | Zhang et al. ........... 361/679.37 |

* cited by examiner

*Primary Examiner*—Jayprakash N Gandhi
*Assistant Examiner*—Ingrid Wright
(74) *Attorney, Agent, or Firm*—Frank R. Niranjan

(57) ABSTRACT

A mounting apparatus for mounting a data storage device with a sliding member attached thereon, includes a bracket and a latch member slidably mounted on the side plate. The bracket includes a side plate. The side plate defines a slideway for slidably receiving the sliding member of the data storage device. The latch member includes a resilient tab. The latch member is slidable on the side plate between a first position wherein the resilient tab is located at a halfway of the slideway so as to block the sliding member from passing therethrough, and a second position wherein the resilient tab is located outside the slideway so as to allow the sliding member to pass therethrough.

15 Claims, 4 Drawing Sheets

MOUNTING APPARATUS FOR STORAGE DEVICE

BACKGROUND

1. Technical Field

The present invention relates to a mounting mechanism for storage device, and more particularly to a mounting apparatus which facilitates attachment of a storage device to a computer chassis.

2. Description of Related Art

Computers have been widely used in modern life. It is desirable for a user or technician to conveniently access internal devices such as storage devices, expansion cards and Motherboard for servicing. However, storage devices, such as hard disk drives, compact disk read-only memory (CD-ROM) drives, digital video disc (DVD) drives, floppy disk drives, and the like are typically secured in a computer chassis with screws or bolts. It is complicated and time-consuming to manipulate the screws or bolts to remove the storage device.

As disclosed in U.S. Pat. No. 5,349,483, a hard disk drive is firstly attached to a sliding box with screws, and the sliding box is inserted in a chamber in a computer chassis and releasably locked in place through tendon-and-mortise joints. It is tedious to manipulate screws to detach the hard disk drive from the box when needed.

What is needed, therefore, is an improved mounting apparatus for storage devices which solves the above-mentioned problems.

SUMMARY

A mounting apparatus for mounting a data storage device with a sliding member attached thereon, includes a bracket and a latch member slidably mounted on the side plate. The bracket includes a side plate. The side plate defines a slideway for slidably receiving the sliding member of the data storage device. The latch member includes a resilient tab. The latch member is slidable on the side plate between a first position wherein the resilient tab is located at a halfway of the slideway so as to block the sliding member from passing therethrough, and a second position wherein the resilient tab is located outside the slideway so as to allow the sliding member to pass therethrough.

Other advantages and novel features of the present invention will become more apparent from the following detailed description of preferred embodiment when taken in conjunction with the accompanying drawings, in which:

DETAILED DESCRIPTION OF THE EMBODIMENT

Figure 1:
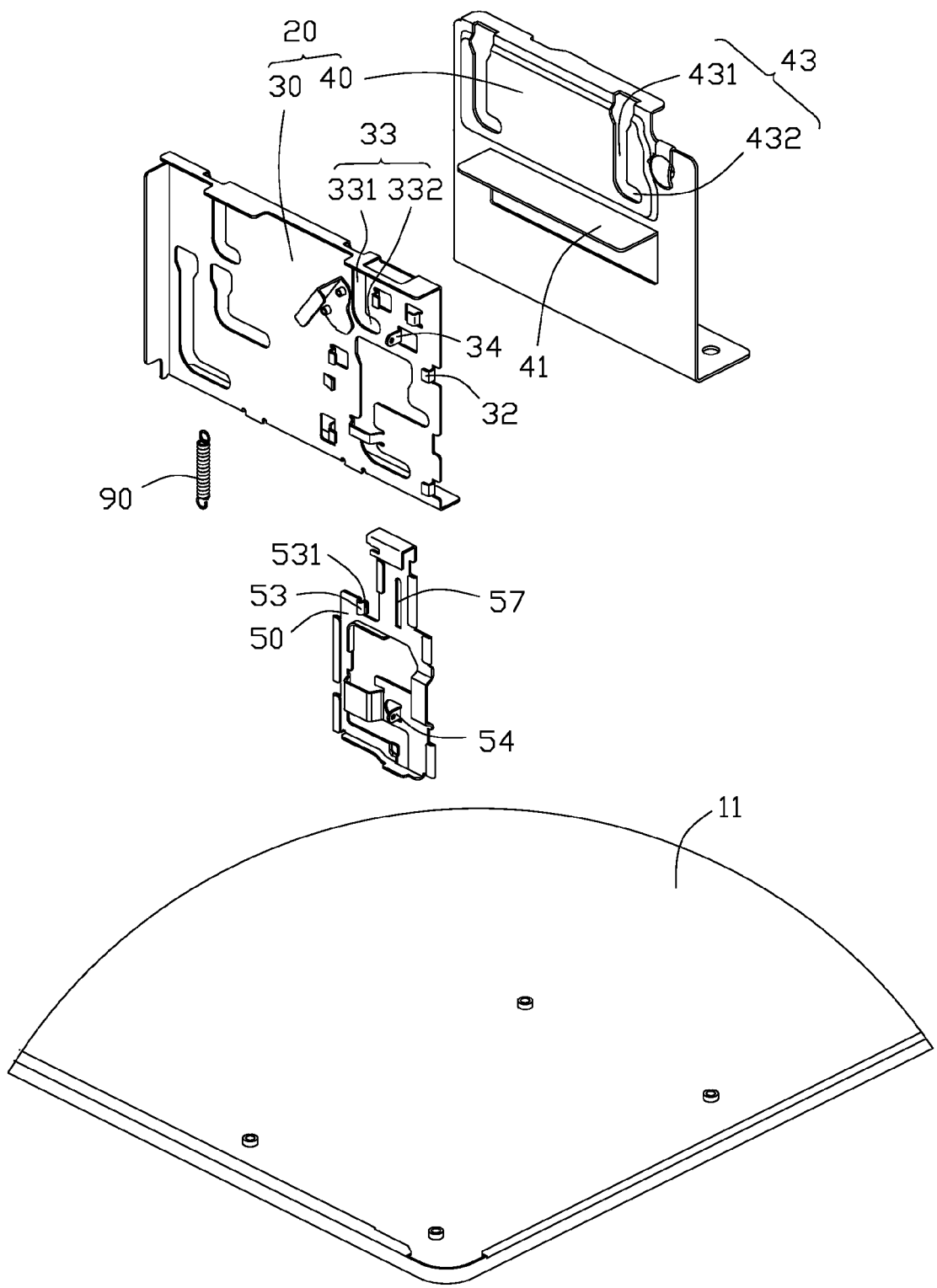
FIG. 1 is an exploded, isometric view of a mounting apparatus.
Figure 2:
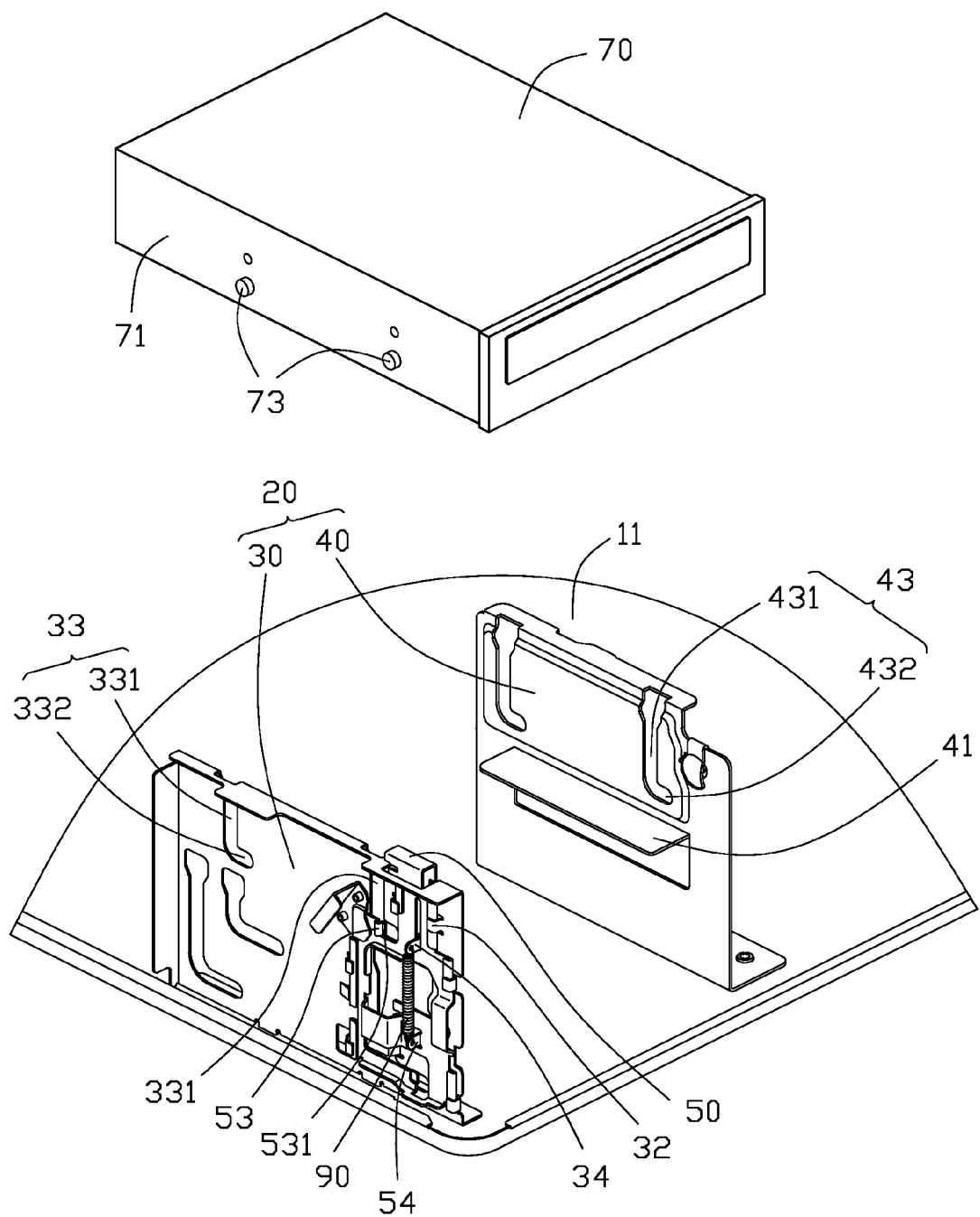
FIG. 2 is an assembled view of the mounting apparatus of FIG. 1 and a data storage device.

Referring to FIGS. 1 and 2, a mounting apparatus is used to mount a data storage device 70 in a bracket 20 of a computer enclosure.

The computer enclosure comprises a bottom board 11. The bracket 20 includes a pair of side plates 30 and 40, which are adapted to be mounted on the bottom board 11 and are parallel with each other. Each of the side plates 30, 40 defines a pair of slideways 33, 43 respectively corresponding to the sliding members 73 of the data storage device 70. Each of the slideways 33/43 has a guiding portion 331/431 extending vertically downwards from a top edge of the side plate 30/40, and a receiving portion 332/432 extending horizontally from an undermost end of the guiding portion 331/431. The side plate 40 forms a supporting plate 41 below the slideway 43 adapted for supporting the data storage device 70 thereon.

The side plate 30 is punched outwards to form a plurality of "L"-shaped clips 32 on an outer surface thereof. A first ear piece 34 is formed on the outer surface of the side plate 30, and a through hole is defined in the first ear piece 34.

A latch member 50 with a generally plate-like structure is adapted to slide on the outer surface of the side plate 30. The latch member 50 defines a slot 57 extending in an up and down direction for receiving the first ear piece 34 sliding therein. An "n"-shaped resilient tab 53 is formed on the latch member 50. The "n"-shaped resilient tab 53 has two separate legs and a connection portion connecting the two legs. one leg has a free end 531 adapted to be pressed to resiliently bend the resilient tab 53. The latch member 50 forms a second ear piece 54 thereon, which is located below the slot 57 of the side plate 30. The second ear piece 54 defines a through hole therein.

The data storage device 70 includes two sidewalls 71, each of which forms a pair of sliding members 73 thereon.

In assembly of the mounting apparatus, opposite upright sides of the latch member 50 are clasped by the clips 32 of the side plate 30 to keep the latch member 50 sliding on the outer surface of the side plate 30 in an up and down direction. A spring 90 is mounted between the first ear piece 34 and the second ear piece 54 with one end of the spring 90 secured in the through hole of the first ear piece 34 and the other end of the spring 90 secured in the through hole of the second ear piece 54. When the latch member 50 is located on the outer surface of the side plate 30 in a balanced position, the spring 90 is extended to generate an elastic force to counterbalance the force of gravity acting on the latch member 50. At the balanced position, the resilient tab 53 of the latch member 50 is located at a middle portion of a corresponding slideway 33 and between a junction of the guiding portion 331 and the receiving portion 332 of the slideway 33. The side plates 30 and 40 are then secured on the bottom board 11 of the computer enclosure.

Figure 3:
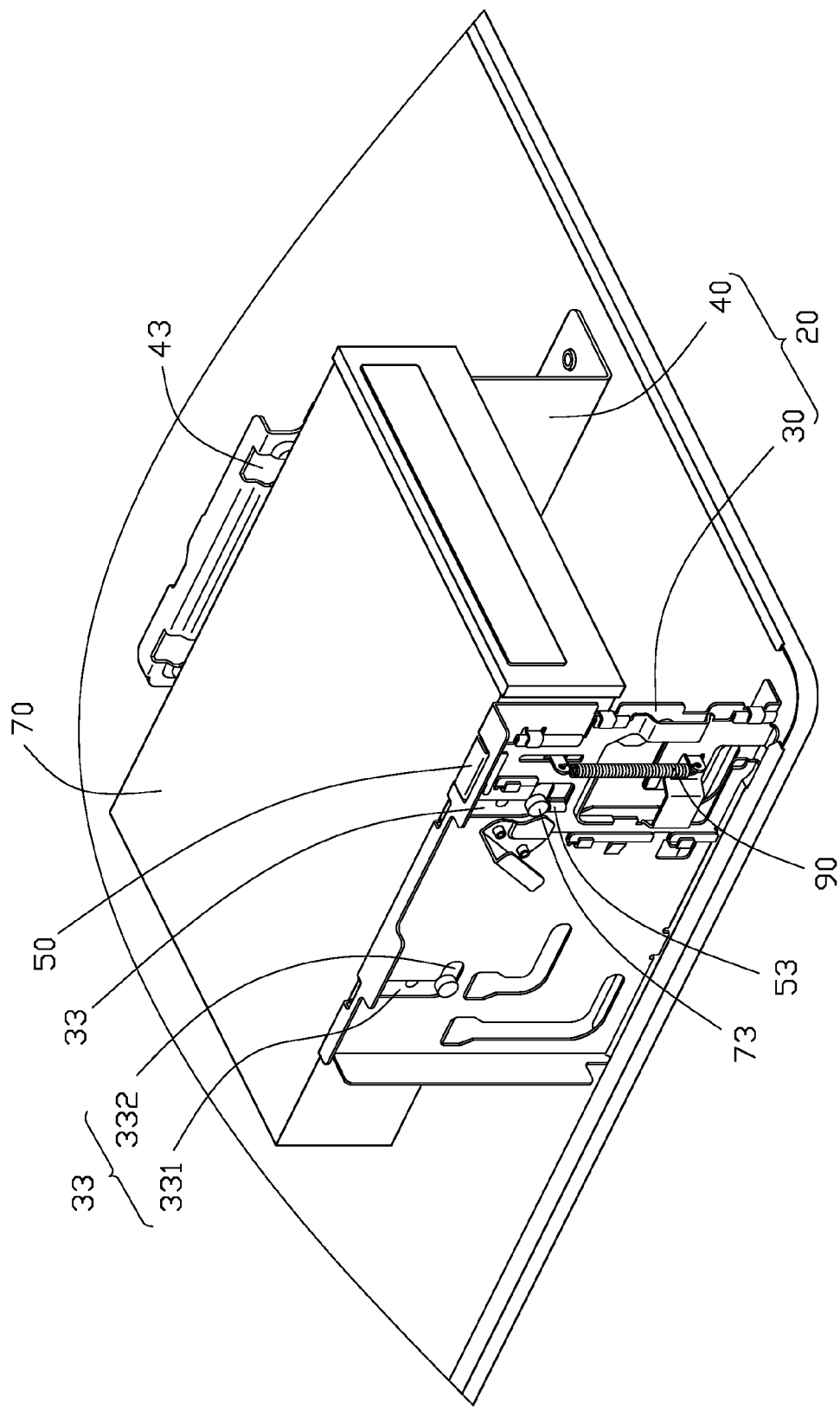
FIG. 3 is a pre-mounted view of mounting the data storage device to the mounting apparatus of FIG. 2.
Figure 4:
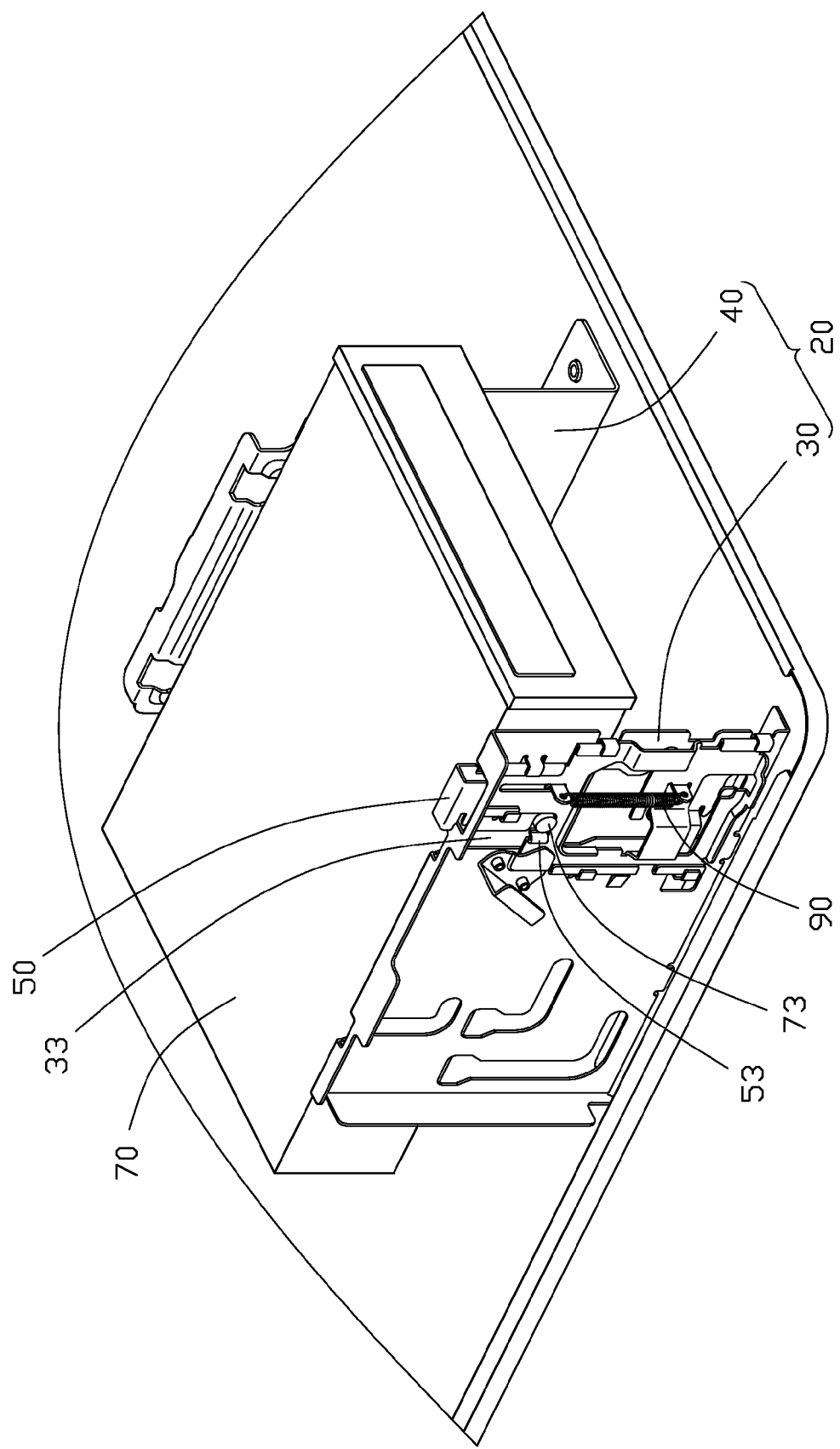
FIG. 4 is a mounted view of mounting the data storage device to the mounting apparatus of FIG. 2.

Referring to FIGS. 2, 3, and 4, the data storage device 70 is placed in the bracket 20 with the sliding members 73 sliding into the receiving portions 331, 431 of the slideways 33, 43. When one of the sliding members 73 resists against a top edge of the resilient tab 53, the sliding member 73 pushes the latch member 50 downwards to extend the spring 90. The data storage device 70 moves down further, and the sliding member 73 slides into the guiding portion 331 further to be positioned in the junction of the guiding portion 331 and the receiving portion 332. The data storage device 70 then slides horizontally to have the sliding members 73 sliding into the receiving portions 332, 432 of the slideways 33, 43. The sliding member 73 does not resist against the top edge of the resilient tab 53 again. The latch member 50 is slid upwards to the balanced position by the resilient force of the spring 90. The free end 531 of the resilient tab 53 resists against the sliding member 73 to block the resilient tab 53 sliding away from the slideway 33.

If the data storage device 70 is jarred as could happen during transport, the resilient tab 531, which resists against the sliding member 73, is resiliently deformed to dampen the shock to the data storage device 70. So the data storage device 70 is protected.

In disassembly of the data storage device 70 from the bracket 20, the latch member 50 is pressed downwards to have the resilient tab 531 disengage from the sliding member 73. The sliding members 73 slide from the slideway 43 to detach the data storage device 70 from the bracket 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for mounting a data storage device with a sliding member attached thereon, comprising:
    a bracket comprising a side plate, the side plate defining a slideway for slidably receiving the sliding member of the data storage device; and
    a latch member slidably mounted on the side plate, the latch member comprising a resilient tab, the latch member being slidable on the side plate between a first position wherein the resilient tab is located at a halfway of the slideway so as to block the sliding member from passing therethrough, and a second position wherein the resilient tab is located outside the slideway so as to allow the sliding member to pass therethrough;
    wherein a spring is mounted between the latching member and the side plate in a manner such that when the spring is in a natural state, the resilient tab is located at the halfway of the slideway.

2. The mounting apparatus as described in claim 1, wherein the resilient tab is "n"-shaped, and has a free end for resisting against the sliding member to resiliently bend the resilient tab when the latch member is in the first position.

3. The mounting apparatus as described in claim 1, wherein the latch member is movable in an up and down direction on the side plate.

4. The mounting apparatus as described in claim 1, wherein the slideway has an guiding portion extending vertically downwards from a top edge of the side plate, and a receiving portion extending horizontally from an undermost end of the guiding portion.

5. The mounting apparatus as described in claim 4, wherein the sliding member is located at a junction of the guiding portion and the receiving portion.

6. The mounting apparatus as described in claim 1, wherein the side plate forms a plurality of clips thereon, opposite upright sides of the latch member are clasped by the clips to restrict the latch member sliding on the side plate in an up and down direction.

7. The mounting apparatus as described in claim 1, wherein the side plate forms a supporting plate below the slideway, and the supporting plate is configured for supporting the data storage device thereon.

8. A mounting apparatus for mounting a data storage device with a sliding member attached thereon, comprising:
    a bracket comprising a side plate, the side plate defining a slideway extending downwards from a top edge of the side plate, the sliding member sliding in the slideway from the top edge of the side plate and received in a bottom end of the slideway; and
    a latch member mounted on the side plate, the latch member comprising a resilient tab located at a halfway of the slideway to block the sliding member passing therefrom, wherein the resilient tab is "n"-shaped, and has a first and a second legs and a connection portion connecting the first leg with the second leg; the first leg has a free end which resists against the sliding member to resiliently bend the free end at the position where the sliding member is blocked by the resilient tab.

9. The mounting apparatus as described in claim 8, wherein the latch member is reciprocally slidably mounted on the side plate in such a manner that when the sliding member sliding in the slideway, the resilient tab is moved away from the halfway position of the slideway, and when the sliding member passes through the halfway position in the slideway, the latch member is moved back to the original position to have the resilient tab return to the halfway position to block the sliding member.

10. The mounting apparatus as described in claim 9, wherein a spring is mounted between the latch member and the side plate to rebound the latch member to a balanced position at which the resilient tab located at a middle portion of the slideway.

11. The mounting apparatus as described in claim 10, wherein the latch member is moved in an up and down direction on the side plate, and an elastic force of the spring is balanced with a gravity of the latch member when the latch member in the balanced position.

12. The mounting apparatus as described in claim 8, wherein the slideway has an guiding portion extending downwards from a top edge of the side plate, and a receiving portion extending horizontally from an undermost end of the guiding portion.

13. The mounting apparatus as described in claim 12, wherein the sliding member is located at a junction of the guiding portion and the receiving portion.

14. The mounting apparatus as described in claim 8, wherein the side plate forms a plurality of clips thereon, opposite upright sides of the latch member are clasped by the clips to restrict the latch member sliding on the side plate in an up and down direction.

15. The mounting apparatus as described in claim 8, wherein the side plate forms a supporting plate below the sideway, and the supporting plate is configured for supporting the data storage device thereon.

* * * * *